United States Patent Office 2,975,159
Patented Mar. 14, 1961

2,975,159

RUBBER-LIKE INTERPOLYMERS OF ETHYLENE AND TWO OTHER MONOOLEFINS

Viktor Weinmayr, Landenberg, Pa., assignor to E. I. du Pont de Nemours and Company, Wilmington, Del., a corporation of Delaware No Drawing. Filed Aug. 18, 1955, Ser. No. 529,360

5 Claims. (Cl. 260—80.5)

This invention relates to rubber-like olefin polymers and more particularly to such polymers which are capable of being cured.

Certain high polymers of aliphatic monoolefins, some of which have been made available through the use of recently discovered catalysts, have physical properties somewhat like those of natural rubber. Their chemical constitution, since they are hydrocarbons of very slight, if any, unsaturation, suggests that they would have great resistance to oxidation and other chemical attack but that they could not be cured by the usual methods which involve reactions of double bonds or other reactive groups in elastomer molecule. In addition, many of these somewhat rubbery high polymers have physical properties such as insufficient plasticity and tackiness required in the milling and fabricating, which make them unpractical for general use in the rubber art.

It is an object of the present invention to prepare relatively high molecular weight interpolymers of ethylene, propylene, and higher olefins which have improved physical properties in the plastic state and which are capable of being cured to elastic rubber-like products. It is a further object of the invention to prepare three component polymers comprising ethylene and either propylene or butene-1 in a ratio of between 3:1 and 1:3 and, as the third component, a different olefin of the formula $CH_2=CHR$, where R is an alkyl radical containing from 2 to 8 carbon atoms, said third olefin being present in from 2 to 20 mol percent of the interpolymer.

It has now been found that interpolymers of three different olefins can be produced by interpolymerization of the mixed olefin using a catalyst normally used in coordination polymerization, preferably one that contains titanium with a valence of less than 4. Such catalysts are conveniently made by the reaction of lithium-aluminum alkyl with titanium tetrachloride in a hydrocarbon solvent which may also serve as a solvent in carrying out the polymerization of the olefins. Using such catalysts, the polymerization may take place at ordinary atmospheric temperatures and pressures. It is usually convenient to allow the temperature to rise spontaneously to 50° or 60° C. due to the heat of the reaction. The rate of reaction may be increased by increasing the concentration of the monomer, by increasing the pressure, or increasing the temperature. It should be understood, however, that the temperature and pressure employed are not critical.

The homopolymers of ethylene and of propylene have the properties of rubber only to a very limited extent. The homopolymer of butene-1 and of higher members of the series are somewhat more rubbery but cannot be satisfactorily cured. Interpolymers of ethylene and propylene and of ethylene and butene-1 still do not mill satisfactorily, while interpolymers of propylene and butene-1, like the polymer of butene-1, cannot be satisfactorily cured. Within the limits of the present invention, however, the compositions are plastic, readily milled, and capable of being cured to elastic, rubber-like products with selected peroxides such as dicumyl peroxide, without decomposition.

The following examples are given to illustrate the invention:

EXAMPLE 1

A mixture of ethylene, propylene, and butene-1 was polymerized using a catalyst made as follows. Lithium aluminum hydride, 3.05 grams (0.08 mol) and 56 grams (0.4 mol) of decene-1 were heated at 140–160° C. for three hours in strict absence of water and oxygen. The reaction product was then cooled and taken up in 3 liters of benzene and reacted with 4.9 grams (0.026 mol) of titanium tetrachloride. A fine black suspension of the catalyst in benzene resulted. Still working in absence of water and oxygen, a mixture of 38% ethylene, 57% propylene, and 5% butene-1 by weight (corresponding to 16 mols of each of the first two per mol of butene-1) was passed at 25° C. and slightly more than atmospheric pressure into this benzene suspension. Absorption was complete. The temperature rose spontaneously to 50° C. The solution gradually became viscous. When 200 grams of the gas mixture had been absorbed, the polymer was isolated by pouring the benzene solution into methanol containing hydrogen chloride and drying the precipitate by milling on a rubber mill. 180 g. of polymer was obtained. The polymer was very light in color, had good tack and formed a smooth band on the mill. It contained only about 0.2% ash, as sulfate. When compounded with 40 parts by weight (per 100 parts of polymer) of a semi-reinforcing carbon black, 5 parts of zinc oxide, and 1.75 parts of dicumyl peroxide and cured for 60 minutes at 153° C., it had a tensile strength of 1800 lbs. per square inch, a modulus at 200% elongation of 600 and an elongation at break of 600%.

Although a fairly high proportion of catalysts was used in the above example, much smaller proportions are entirely operable. In the example, absorption was still rapid when the run was stopped and much more could have been absorbed, using the original catalyst, the only limit being the increasing viscosity of the solution and the resulting difficulty of agitation. The proportion of catalyst does not greatly influence the character of the polymer.

It has been established by examination of the benzene-alcohol mixture from which the polymer precipitates, that little if any of the decene used in making the catalyst enters into the polymer.

In the examples given in Table I below, other ratios of olefins were used, within definition of the invention, following the procedure of Example 1. Products similar to that of Example 1 in color and milling characteristics were obtained. When compounded and cured as in Example 1, the physical properties were the same within the experimental variation.

Table I

| Example No. | Molar Ratio of Olefins | | |
|---|---|---|---|
| | Ethylene | Propylene | Butene-1 |
| 1 | 16 | 16 | 1 |
| 2 | 16 | 8 | 1 |
| 3 | 8 | 16 | 1 |
| 4 | 8 | 8 | 1 |
| 5 | 4 | 4 | 1 |
| 6 | 2 | 2 | 1 |

EXAMPLE 7

Following the general procedure of Example 1, a catalyst was made from 1.14 grams of lithium aluminum hydride, 21 grams of decene-1, and 3.8 grams of titanium tetrachloride in one liter of benzene. During 7.5 hours, 61.0 grams of ethylene, 41.5 grams of propylene, and 15.5 grams of hexene-1 (mol ratio 8:8:1) were introduced simultaneously with agitation, the hexene being added as liquid through a dropping funnel. The temperature was kept between 25° and 40° C. The polymer (70.5 g.) was then isolated from the resulting viscous reaction mass as in Example 1, in the form of a rubber-like material of light color.

EXAMPLES 8 and 9

Similar polymers were made from ethylene, propylene, and 4-methyl-1-pentene and from ethylene, butene-1, and hexene-1 in the ratio 8:8:1, by the same procedure. These and the polymer of Example 7 were compounded with 40 parts of a semi-reinforcing carbon black, 5 parts of zinc oxide and 4 parts of dicumyl peroxide per 100 parts by weight of the polymer, and were cured for 60 minutes at 153° C. The physical properties are given in Table II.

Table II

| Example Number | Composition | Tensile Strength, Lbs./sq. in. | Modulus (200%) | Elongation at Break, Percent |
|---|---|---|---|---|
| 7 | Ethylene—8<br>Propylene—8<br>Hexene-1—1 | 1,100 | 1,100 | 200 |
| 8 | Ethylene—8<br>Propylene—8<br>4-Methyl-1-pentene—1 | 1,400 | 600 | 400 |
| 9 | Ethylene—8<br>Butene-1—8<br>Hexene-1—1 | 950 | 700 | 250 |

The monomers are usually added simultaneously to the catalyst solution over a period of several hours. When all react at about the same rate, they are added in the ratio in which they are desired in the interpolymer. When one monomer reacts more slowly than the others, as may be the case with the higher olefins, all of that monomer may be added at the start or, alternatively it may be added at a faster rate than the others.

As mentioned above, the best rubber-like properties are obtained in compositions within the defined scope of the invention. Outside these limits, the polymers are less satisfactory as elastomers. Thus, a product containing 16 mols of ethylene, 1 mol of butene-1 and only 4 mols of propylene, thus having an ethylene-propylene ratio greater than the maximum of 3:1 in the definition, is decidedly deficient in milling properties. Furthermore, the polymers of the present invention must be interpolymers, that is, all of their olefin constituents must be in chemical combination with each other, as results when their mixtures are subjected to polymerizing conditions. When the separately formed homopolymers are mixed, or even when a homopolymer of one is mixed with an interpolymer of the other two, results are different and less satisfactory. Thus, when the separately formed homopolymer of butene-1 was mixed with an interpolymer of equimolecular amounts of ethylene and propylene, the good milling properties of the three-component interpolymers of ethylene, propylene and butene-1 of the same over-all composition shown in Examples 1, 4, 5 and 6 were not obtained.

It likewise appears to be important that the third component should have the structure $CH_2=CHR$ (where R is an alkyl radical containing from 2 to 8 carbon atoms), that is, that three of the hydrogens of the ethylene structure should be unsubstituted. Thus, isobutylene cannot in general be used in place of butene-1.

The products of this invention have rubber-like physical properties. They are soluble in aromatic hydrocarbons and have osmotic molecular weights of about 50,000. They have excellent resistance to oxygen and ozone, and good elasticity and tensile strength when cured.

While these rubber-like interpolymers may be vulcanized into shaped articles without the addition of fillers, extenders, etc., the addition of such materials normally used in rubber and synthetic rubber gives vulcanizates of better tensile strength and other improved properties.

The interpolymers of this invention in the uncured state are tough, rubbery and plastic, and have good tack so they may be built into laminated structures and then cured. The tack of these three component polymers is much improved over the two component polymers.

The products of this invention are suitable for the manufacture of all types of articles such as are usually made from natural and synthetic rubbers, particularly where exceptional resistance to oxidation is required. In addition, these products are suitable for chlorosulfonation by the method by which polyethylene is chlorosulfonated, giving products of improved physical properties.

What is claimed is:

1. A rubber-like interpolymer comprising three different olefins as components of said polymer, one of said components being ethylene, the second component being an olefin of the class consisting of propylene and butene-1, which two components are contained in the interpolymer in a molar ratio of from 3:1 to 1:3, the third component being an olefin different from the first two and having the formula $CH_2=CHR$ wherein R is an alkyl radical of from 2 to 8 carbon atoms, said third component being present in the interpolymer in an amount of from 2 to 20 mol percent of the interpolymer, said interpolymer having physical properties similar to those of uncured natural rubber and capable of being cured with dicumyl peroxide to give rubber-like interpolymers having excellent resistance to oxygen and ozone and good elastic and tensile strength.

2. A rubber-like interpolymer composed of ethylene, propylene and butene-1 in a molar ratio of from 2:2:1 to 16:16:1 which, prior to curing, is a light-colored rubber-like material having good plasticity and tack and capable of being cured with dicumyl peroxide to give rubber-like interpolymers having excellent resistance to oxygen and ozone and good elastic and tensile strength.

3. A rubber-like interpolymer composed of ethylene, propylene and butene-1 in a molar ratio of 8:8:1, being a light-colored rubber-like material having good plasticity and tack, and capable of being cured with dicumyl peroxide to give rubber-like interpolymers having excellent resistance to oxygen and ozone and good elastic and tensile strength.

4. A process for preparing rubber-like interpolymers of three different olefins, one being ethylene, the second being of the group consisting of propylene and butene-1, and the third being different from the first two and having the formula $CH_2=CHR$ wherein R is an alkyl radical of from 2 to 8 carbon atoms, said polymerization being carried out at ordinary atmospheric temperatures to 60° C. in the presence of a catalyst used in coordination polymerization and containing titanium with a valence of less than 4 prepared from titanium tetrachloride by reaction with a lithium aluminum alkyl in a hydrocarbon solvent, the interpolymer obtained containing a molar ratio of from 3:1 to 1:3 of ethylene to olefin of the group consisting of propylene and butene-1 and the third olefin being present in the interpolymer in an amount of from 2 to 20 mol percent of the interpolymer.

5. A process for preparing rubber-like interpolymers of three different olefins, one being ethylene, the second being of the group consisting of propylene and butene-1, and the third being different from the first two and having the formula $CH_2=CHR$ wherein R is an alkyl radical of from 2 to 8 carbon atoms, said polymerization being carried out at ordinary atmospheric temperatures to 60° C. in the presence of a catalyst used in coordination polymerization and containing titanium with a valence of less than 4 prepared from titanium tetrachloride by reaction with a lithium aluminum alkyl in a hydrocarbon solvent, the interpolymer obtained containing a molar ratio of from 2:1 to 1:2 of ethylene to olefin of the group consisting of propylene and butene-1 and the third olefin being present in the interpolymer in an amount of from 2 to 20 mol percent of the interpolymer.

References Cited in the file of this patent

UNITED STATES PATENTS

| | | |
|---|---|---|
| 2,691,647 | Field et al. | Oct. 12, 1954 |
| 2,692,257 | Zletz | Oct. 19, 1954 |
| 2,692,258 | Roebuck et al. | Oct. 19, 1954 |
| 2,728,752 | Brown | Dec. 27, 1955 |